US012755630B2

(12) United States Patent
Zamanipour et al.

(10) Patent No.: US 12,755,630 B2
(45) Date of Patent: Oct. 6, 2026

(54) SYSTEM AND METHOD FOR INTERSECTION OPERATION

(71) Applicant: Torc Robotics, Inc., Blacksburg, VA (US)

(72) Inventors: Mehdi Zamanipour, McLean, VA (US); Rasika Kangutkar, Austin, TX (US)

(73) Assignee: Torc Robotics, Inc., Blacksburg, VA (US)

( * ) Notice: Subject to any disclaimer, the term of this patent is extended or adjusted under 35 U.S.C. 154(b) by 0 days.

(21) Appl. No.: 18/979,846

(22) Filed: Dec. 13, 2024

(65) Prior Publication Data

US 2026/0170950 A1 Jun. 18, 2026

(51) Int. Cl.
*G08G 1/07* (2006.01)
*B60W 50/02* (2012.01)
*H04W 4/44* (2018.01)

(52) U.S. Cl.
CPC ........... *G08G 1/07* (2013.01); *B60W 50/0205* (2013.01); *H04W 4/44* (2018.02); *B60W 2050/0215* (2013.01)

(58) Field of Classification Search
None
See application file for complete search history.

(56) References Cited

U.S. PATENT DOCUMENTS 10,186,146 B2 * 1/2019 Hirotsu ................ G08G 1/0145
11,908,327 B2 * 2/2024 Vassilovski ..... B60W 30/18159
12,020,563 B2 * 6/2024 Ran .................. G08G 1/096725
2008/0046165 A1 * 2/2008 Downs ................ G08G 1/0104 701/117
2017/0345294 A1 * 11/2017 Hirotsu ................ G08G 1/0112
2020/0020227 A1 * 1/2020 Ran ........................ G08G 1/075
2021/0311491 A1 * 10/2021 Li ........................ G08G 1/0116
2022/0365530 A1 * 11/2022 Foster .................. G05D 1/0022
2024/0178028 A1 * 5/2024 Yoon .................. H10P 72/0604

FOREIGN PATENT DOCUMENTS

CN 111210618 B 6/2022
JP 2001283381 A * 10/2001
WO 2023/113384 A1 6/2023

* cited by examiner

*Primary Examiner* — Carlos Garcia
(74) *Attorney, Agent, or Firm* — McCarter & English, LLP

(57) ABSTRACT

A system for intersection operation is provided. The system includes a roadside unit associated with an intersection including a traffic signal. The system includes at least one sensor configured to be located on a vehicle. The system includes a processing device in communication with the roadside unit and the at least one sensor. The processing device is configured to execute instructions stored in a memory to perform operations that include detecting failure or improper operation of the at least one sensor indicative of a degraded operation mode of the vehicle. The operations include communicating to the roadside unit the degraded operation mode of the vehicle. The operations include causing the roadside unit to permit coordinated travel of the vehicle through the intersection.

20 Claims, 8 Drawing Sheets

SYSTEM AND METHOD FOR INTERSECTION OPERATION

TECHNICAL FIELD

The field of the disclosure relates to intersection operation and, in particular, to a system for vehicle communication with a roadside unit associated with an intersection during a degraded operation mode to ensure safe travel of the vehicle through the intersection.

BACKGROUND

Autonomous vehicles employ fundamental technologies such as, perception, localization, behaviors and planning, and control. Perception technologies enable an autonomous vehicle to sense and process its environment. Perception technologies process a sensed environment to identify and classify objects, or groups of objects, in the environment, for example, pedestrians, vehicles, or debris. Localization technologies determine, based on the sensed environment, for example, where in the world, or on a map, the autonomous vehicle is. Localization technologies process features in the sensed environment to correlate, or register, those features to known features on a map. Localization technologies may rely on inertial navigation system (INS) data. Behaviors and planning technologies determine how to move through the sensed environment to reach a planned destination. Behaviors and planning technologies process data representing the sensed environment and localization or mapping data to plan maneuvers and routes to reach the planned destination for execution by a controller or a control module. Controller technologies use control theory to determine how to translate desired behaviors and trajectories into actions undertaken by the vehicle through its dynamic mechanical components. This includes steering, braking and acceleration.

The vehicle includes a variety of sensors and processing/computing devices that allow the vehicle to operate each of the noted components, ensuring safe travel along a route. If one or more of these sensors and/or processing/computing devices operates in a degraded manner or fails completely, safe operation of the vehicle may not be possible. Typically, a minimal risk maneuver of the vehicle would involve pulling over on a shoulder to avoid potential collisions with other vehicles or objects, allowing for the failing component to be repaired in a safe location. However, if the vehicle is approaching an intersection, pulling over on a shoulder may not be possible until the vehicle passes through the intersection. With the failed or degraded component, travel through the intersection may not be safe due to, e.g., a lack of perception technologies operation. For example, the vehicle may not be able to perceive the status of the traffic signal or the location/number of surrounding vehicles in the intersection.

Accordingly, there exists a need for a system and a method of intersection operation for a vehicle that communicates with the vehicle to ensure safe travel of the vehicle through the intersection. These and other needs are met by the exemplary system for intersection operation discussed herein.

This section is intended to introduce the reader to various aspects of art that may be related to various aspects of the present disclosure described or claimed below. This description is believed to be helpful in providing the reader with background information to facilitate a better understanding of the various aspects of the present disclosure. Accordingly, it should be understood that these statements are to be read in this light and not as admissions of prior art.

SUMMARY

In one aspect, an exemplary system for intersection operation is provided. The system includes a roadside unit associated with an intersection including a traffic signal. The system includes at least one sensor configured to be located on a vehicle. The system includes a processing device in communication with the roadside unit and the at least one sensor. The processing device is configured to execute instructions stored in a memory to perform operations that include detecting failure or improper operation of the at least one sensor indicative of a degraded operation mode of the vehicle. The operations include communicating to the roadside unit the degraded operation mode of the vehicle. The operations include causing the roadside unit to permit coordinated travel of the vehicle through the intersection (e.g., by changing or modifying operation of the traffic signal).

The vehicle can be an autonomous and/or a semi-autonomous vehicle. The at least one sensor can be configured to detect one or more objects around the vehicle, e.g., other vehicles, pedestrians, motorcyclists, traffic signs, traffic lights, combinations thereof, or the like. In some embodiments, the at least one sensor can be a camera. The camera can include a field-of-view configured to visualize the intersection as the vehicle approaches the intersection. In some embodiments, the at least one sensor can be radar and/or LIDAR. In some embodiments, the at least one sensor can be configured to detect a characteristic associated with an operating component of the vehicle. In some embodiments, the failure or the improper operation of the at least one sensor of the vehicle results in an inability of the vehicle to safely pass through the intersection. In some embodiments, the failure or the improper operation of the at least one sensor of the vehicle results in an inability of the sensor to visualize the intersection.

In some embodiments, causing the roadside unit to permit coordinated travel of the vehicle through the intersection includes the roadside unit changing the traffic signal status with a controller to prioritize travel of the vehicle through the intersection. In some embodiments, upon receiving the request for permitting coordinated travel of the vehicle through the intersection, the roadside unit can be configured to transmit to the processing device a current status of the traffic signal. The current status of the traffic signal can be updated in real-time and transmitted to the processing device with the roadside unit. In some embodiments, upon receiving the request for permitting coordinated travel of the vehicle through the intersection, the roadside unit can be configured to transmit to the processing device a geometry or layout of the intersection. The roadside unit can thereby supplement the degraded or missing information at the vehicle with information gathered by and/or stored in the roadside unit. In some embodiments, the operations can include guiding the vehicle to perform a minimal risk maneuver (MRM) after travel through the intersection. The minimal risk maneuver includes moving the vehicle to a side of a road and stopping, or stopping safely in a shoulder or lane.

In some embodiments, the operations can include transmitting an alert to mission control regarding the degraded operation mode of the vehicle. In some embodiments, the operations can include transmitting an alert to surrounding vehicles capable of supplementing the degraded operation mode of the vehicle. In some embodiments, the surrounding vehicles can include sensors capable of supplementing missing information typically acquired by the at least one sensor of the vehicle.

In another aspect, an exemplary computer-implemented method for intersection operation is provided. The method includes detecting failure or improper operation of at least one sensor configured to be located on a vehicle. Such detection is indicative of a degraded operation mode of the vehicle. The method includes executing instructions stored in a memory with a processing device in communication with the at least one sensor and a roadside unit to perform operations that include communicating to the roadside unit associated with an intersection and including a traffic signal the degraded operation mode of the vehicle. The operations include causing the roadside unit to permit coordinated travel of the vehicle through the intersection. In some embodiments, causing the roadside unit to permit coordinated travel of the vehicle through the intersection can include the roadside unit changing a traffic signal status with a controller to prioritize travel of the vehicle through the intersection.

Various refinements exist of the features noted in relation to the above-mentioned aspects. Further features may also be incorporated in the above-mentioned aspects as well. These refinements and additional features may exist individually or in any combination. For instance, various features discussed below in relation to any of the illustrated examples may be incorporated into any of the above-described aspects, alone or in any combination.

BRIEF DESCRIPTION OF DRAWINGS

The following drawings form part of the present specification and are included to further demonstrate certain aspects of the present disclosure. The disclosure may be better understood by reference to one or more of these drawings in combination with the detailed description of specific embodiments presented herein.

Figure 1:
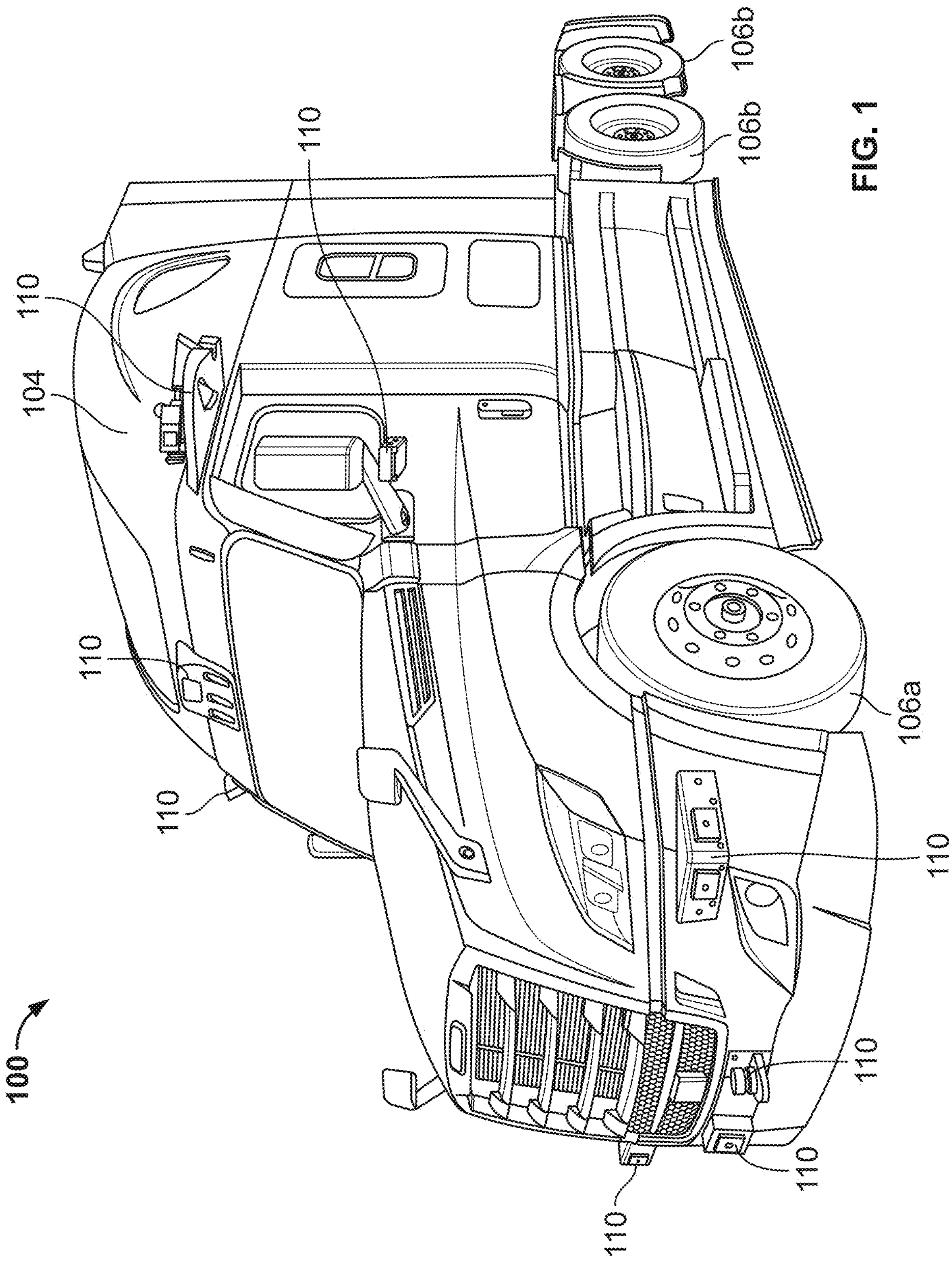
FIG. 1 is a schematic perspective view of an autonomous truck.

Corresponding reference characters indicate corresponding parts throughout the several views of the drawings. Although specific features of various examples may be shown in some drawings and not in others, this is for convenience only. Any feature of any drawing may be referenced or claimed in combination with any feature of any other drawing.

DETAILED DESCRIPTION

The following detailed description and examples set forth preferred materials, components, and procedures used in accordance with the present disclosure. This description and these examples, however, are provided by way of illustration only, and nothing therein shall be deemed to be a limitation upon the overall scope of the present disclosure. The following terms are used in the present disclosure as defined below.

An autonomous vehicle: An autonomous vehicle is a vehicle that is able to operate itself to perform various operations such as controlling or regulating acceleration, braking, steering wheel positioning, and so on, without any human intervention. An autonomous vehicle has an autonomy level of level-4 or level-5 recognized by National Highway Traffic Safety Administration (NHTSA).

A semi-autonomous vehicle: A semi-autonomous vehicle is a vehicle that is able to perform some of the driving related operations such as keeping the vehicle in lane and/or parking the vehicle without human intervention. A semi-autonomous vehicle has an autonomy level of level-1, level-2, or level-3 recognized by NHTSA.

A non-autonomous vehicle: A non-autonomous vehicle is a vehicle that is neither an autonomous vehicle nor a semi-autonomous vehicle. A non-autonomous vehicle has an autonomy level of level-0 recognized by NHTSA.

Degraded and/or failed operation mode or degraded/failed state: A vehicle includes a variety of sensors and processing/computing devices that operate individually and in combination to ensure safe operation of the vehicle. In some embodiments, the vehicle can include sensors with overlapping field-of-views for each specific modality (e.g., multiple cameras covering a field-of-view for the purpose of traffic light detection). In some embodiments, the vehicle can include sensors with overlapping modalities (e.g., overlapping cameras and LiDAR for object detection purpose). Thus, in some instances, the field-of-view of sensors can overlap, allowing one or more sensors to completely stop operation (i.e., fail) or operate in a less than 100% manner (i.e., degraded state), while still allowing the vehicle to operate safely due to the overlap in field-of-view or coverage by other sensors. In such instances, the vehicle may be capable of continuing operation without performing a minimal risk maneuver. However, if the remaining sensors gather conflicting information (that would otherwise not be an issue if the failed/degraded sensor was still operating), the minimal risk maneuver can be performed to avoid unsafe operation of the vehicle. In some instances, failure or degraded operation of one or more sensors can result in unsafe operation of the vehicle because no remaining sensors can be used to replace the missing sensor data, and this would necessitate performing of a minimal risk maneuver and stopping operation of the vehicle until the sensor can be repaired. Thus, in some embodiments, the system can rely on the "majority voting" operation as a policy for determining if the vehicle is in a degraded state or not. This can be utilized in cases such as traffic light detection, where only cameras are used. However, in some embodiments, other policies can be used to determine the degraded state of the vehicle based on the strengths and weaknesses of other modalities, as well as different operational design domain (e.g., different weather, or light, or wind conditions). In some instances, failure or degraded operation of the sensor can occur due to occlusion of the sensor which prevents the sensor from operating at 100%, e.g., mud or dirt on the camera lens, or the like. In some instances, failure or degraded operation can occur if the processing/computing device is incapable of processing sensor data to properly instruct the vehicle operation.

Vehicles (e.g., autonomous or semi-autonomous) can enter a degraded or failed state due to a variety of factors. For example, sensor failure, sensor obstruction, computing failure, or combinations thereof, can result in the vehicle entering or being in the degraded or failed state. This degraded or failed state of the vehicle results in potentially unsafe operation, necessitating that the vehicle perform a minimal risk maneuver (MRM) as soon as possible to stop operation among other vehicles and pedestrians. However, having the vehicle perform the MRM solely depending on its onboard sensors can prove to be significantly challenging when one or more sensors have failed or are degraded.

An MRM can include, e.g., taking the nearest exit and pulling the vehicle over to a shoulder, or stopping in a lane. Performing the MRM in a congested and/or uncertain environment can increase the level of complexity of conducting the maneuver safely. If the vehicle is traveling along a straight road with no traffic lights or street signs, and little traffic volume, performing the MRM can be less complex of a procedure. However, if the vehicle is approaching a controlled intersection having a traffic signal, performing the MRM can be particularly complex. In particular, the vehicle may need to pass through the intersection safely in order to reach a location where the MRM can be performed. With the degraded or failed operation mode, such safe travel for the vehicle—on its own—may be impossible.

Various communication platforms can be used to assist with operation of the vehicle as the vehicle travels along a road/route. For example, cellular-vehicle-to-everything (C-V2X) technology allows vehicles to communicate directly with other vehicles (V2V), infrastructure (V2I), and vulnerable road users (V2P), with low-latency messages to drive applications that can have an immediate safety benefit. To improve or allow for the safe operation for the vehicle in the degraded or failed state in general, and particularly when approaching and passing through intersections, the exemplary system can use V2I communications technology to establish communication between the vehicle and the roadside unit associated with the intersection. In some embodiments, roadside units can generally be positioned along a roadway to facilitate communication between vehicles and transportation infrastructure. (See, e.g., What is a Roadside Unit (RSU)?, ISARSOFT, https://www.isarsoft.com/knowledge-hub/rsu). In some embodiments, roadside units can be a radio for transmitting messages between vehicles and transportation infrastructure, such as a traffic signal. In some embodiments, roadside units can include a computer or processing device that controls the traffic signal controller, in some instances including the crosswalk controller as well.

In some embodiments, the vehicle would need to be within a predetermined distance of the intersection/traffic signal for communication to occur with the roadside unit(s), e.g., a minimum of 300 m, or the like. If the vehicle is further from the intersection/traffic signal, the vehicle can attempt a minimum risk maneuver and pull over on the side of the road or in a safe location. However, if the vehicle is within a predetermined distance from the intersection/traffic signal, communication with the roadside unit can occur to assist the degraded vehicle in safely passing through the intersection and performing the minimum risk maneuver after the intersection is passed. Once the vehicle enters the degraded state while approaching an intersection, the vehicle can transmit a communication to the surrounding connected infrastructure (e.g., roadside unit(s), such that the infrastructure can be used to assist the vehicle in travel through the intersection in a safe manner. For example, the roadside unit can transmit information to the vehicle to supplement the degraded or missing sensor data, thereby allowing for fusion of the data to allow for safe guidance and travel of the vehicle through the intersection.

In some embodiments, the roadside unit information can be used to guide the vehicle to slow down and stop at the intersection, and further guide the vehicle to pass through the intersection when the traffic signal has been appropriately actuated to allow for safe travel. In some embodiments, the roadside unit information can be used to control the traffic signal to prioritize travel of the vehicle through the intersection. In some embodiments, the roadside unit information can be used to control the pedestrian crossing signal to avoid crossing of the road in front of the degraded state vehicle.

The exemplary system therefore increases the safety for the vehicle operation at and through the intersection. The data collected by sensors of the vehicle can be augmented with additional information from the roadside unit participating in the V2X to provide the vehicle with a holistic view of the environment, given its degraded state. In some embodiments, surrounding vehicles can transmit sensor data to the degraded state vehicle to supplement the missing sensor data (e.g., via fusion of data) for safe travel through the intersection. The data provided to the degraded state vehicle enables the vehicle to plan an effective MRM after travel through the intersection. If the degraded state vehicle does not have a way to communicate its degraded state outwardly and gather information, the vehicle can perform the MRM by stopping in the lane for a worst case scenario. This can lead to a blocked box scenario and disrupt traffic flow, but may be the only means for safe operation of the vehicle if outward communication is not available.

In some embodiments, the degraded state vehicle can communicate its degraded state with relevant information (e.g., type of sensors failing or degraded, type of information missing, type of information needed for safe operation, or the like) to mission control and/or the roadside unit located at the nearest or approaching intersection. Communication between the roadside unit and the vehicle can be performed in the following steps, although it should be understood that mission control can facilitate communication between the vehicle and the roadside unit as well. The degraded vehicle broadcasts its degraded mode to the roadside unit. The roadside unit receives the degraded status of the vehicle, and optimizes the traffic signal operation at the intersection to allow the degraded vehicle to pass through the intersection as soon as possible. For example, the roadside unit can set the appropriate traffic signal to green to allow the vehicle to pass through. The roadside unit can broadcast or transmit a map of the intersection to the vehicle, and the degraded vehicle can use this map information to navigate through the intersection. After passing through the intersection, the vehicle can locate a spot to pull over for the MRM based on the augmented/fused information, e.g., by using the map information from the roadside unit.

This operation of the exemplary system provides several benefits to the degraded state vehicle. The vehicle is provided with priority to pass through the intersection as soon as possible. The vehicle receives confirmation of what the exact state of the traffic signal is in the case of an onboard sensor failure. The vehicle receives the geometry and topology associated with the intersection, allowing for location of an area to safely pull over. With this added V2X information, the degraded vehicle improves the safety of performing the needed MRM.

Various embodiments in the present disclosure are described with reference to FIGS. 1-8 below.

Figure 2:
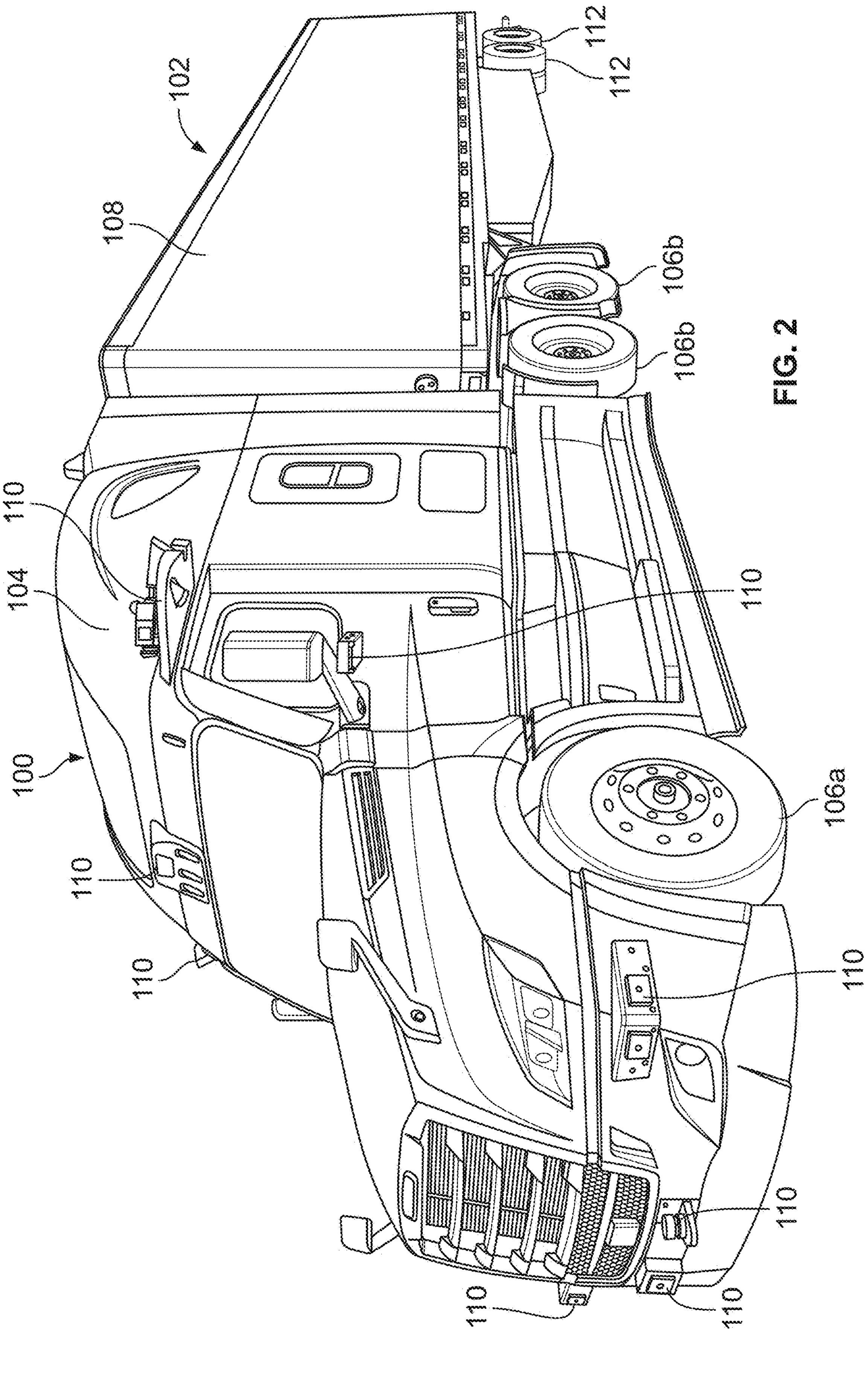
FIG. 2 is a schematic perspective view of an autonomous truck and trailer.
Figure 3:
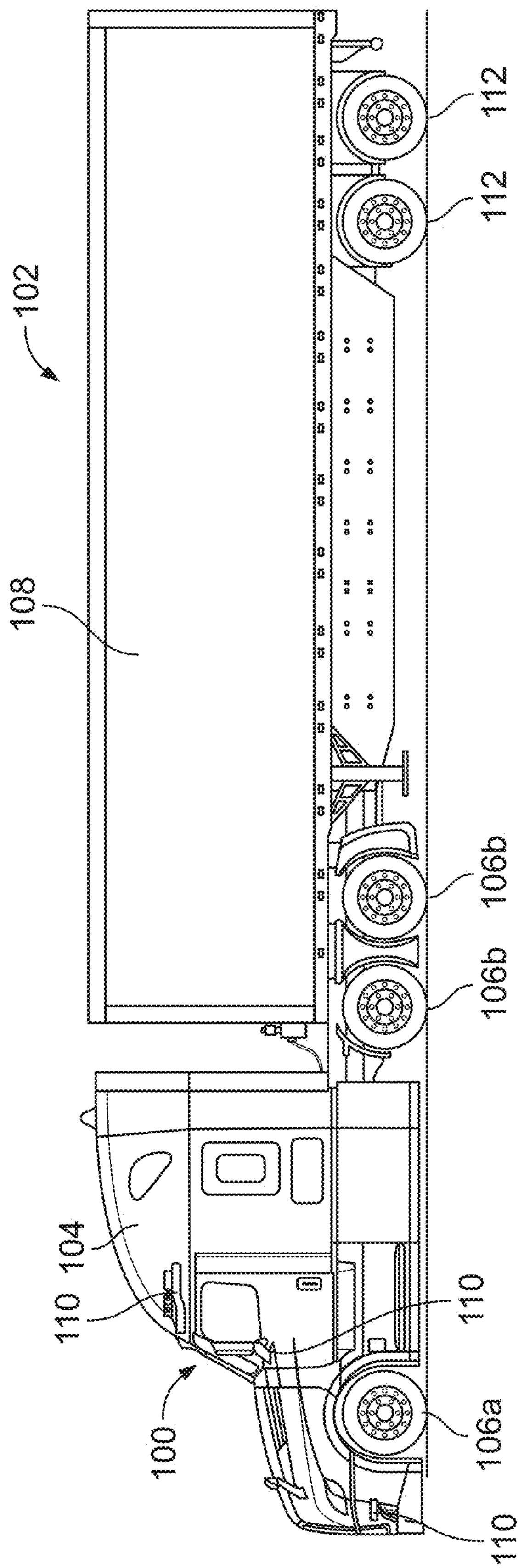
FIG. 3 is a schematic side view of an autonomous truck and trailer.

FIG. 1 is a perspective view of a vehicle 100, such as a truck that may be conventionally connected to a single or tandem trailer 102 to transport the trailer 102 to a desired location, as shown in FIGS. 2 and 3, which are, respectively, perspective and side views of the vehicle 100 of FIG. 1 with the trailer 102 attached thereto. The vehicle 100 includes a cabin 104 that can be supported, and steered in the required direction, by front wheels 106*a* and rear wheels 106*b* that are partially shown in FIG. 1. The front wheels 106*a* are positioned by a steering system that includes a steering wheel and a steering column (not shown). The steering wheel and the steering column may be located in the interior of cabin 104.

The vehicle 100 may be an autonomous vehicle, in which case the vehicle 100 may omit the steering wheel and the steering column to steer the vehicle 100. Rather, the vehicle 100 may be operated by an autonomy computing system of the vehicle 100 based on data collected by a sensor network including one or more sensors, e.g., sensors 110 shown in FIGS. 1-3. The vehicle 100 may additionally include a fifth-wheel coupling (not shown) to which the trailer 102 can be releasably attached. The trailer 102 can include a storage container 108 and a plurality of rear wheels 112 that support the storage container 108. It should be understood that in some embodiments the vehicle 100 and the trailer 102 can be a permanently attached as a single unit.

The sensors 110 have a field-of-view at the front, sides and/or rear of the vehicle 100. Similar sensors 110 can be used around the perimeter of the vehicle 100 to ensure full environmental coverage around the vehicle 100 is provided by the sensors 110. In some embodiments, the vehicle 100 can include, e.g., 5-6 LIDAR sensors, 8-10 cameras, combinations thereof, or the like. In some embodiments, the vehicle 100 can tow a trailer 102 and the trailer 102 can similarly include LIDAR sensors and/or cameras to provide field-of-view coverage around the perimeter of the vehicle 100 and the trailer 102. The environmental coverage by the sensors and/or cameras therefore provides data corresponding with the front, rear, sides and corners of the vehicle 100 and the trailer 102 hauled by the vehicle 100.

Figure 4:
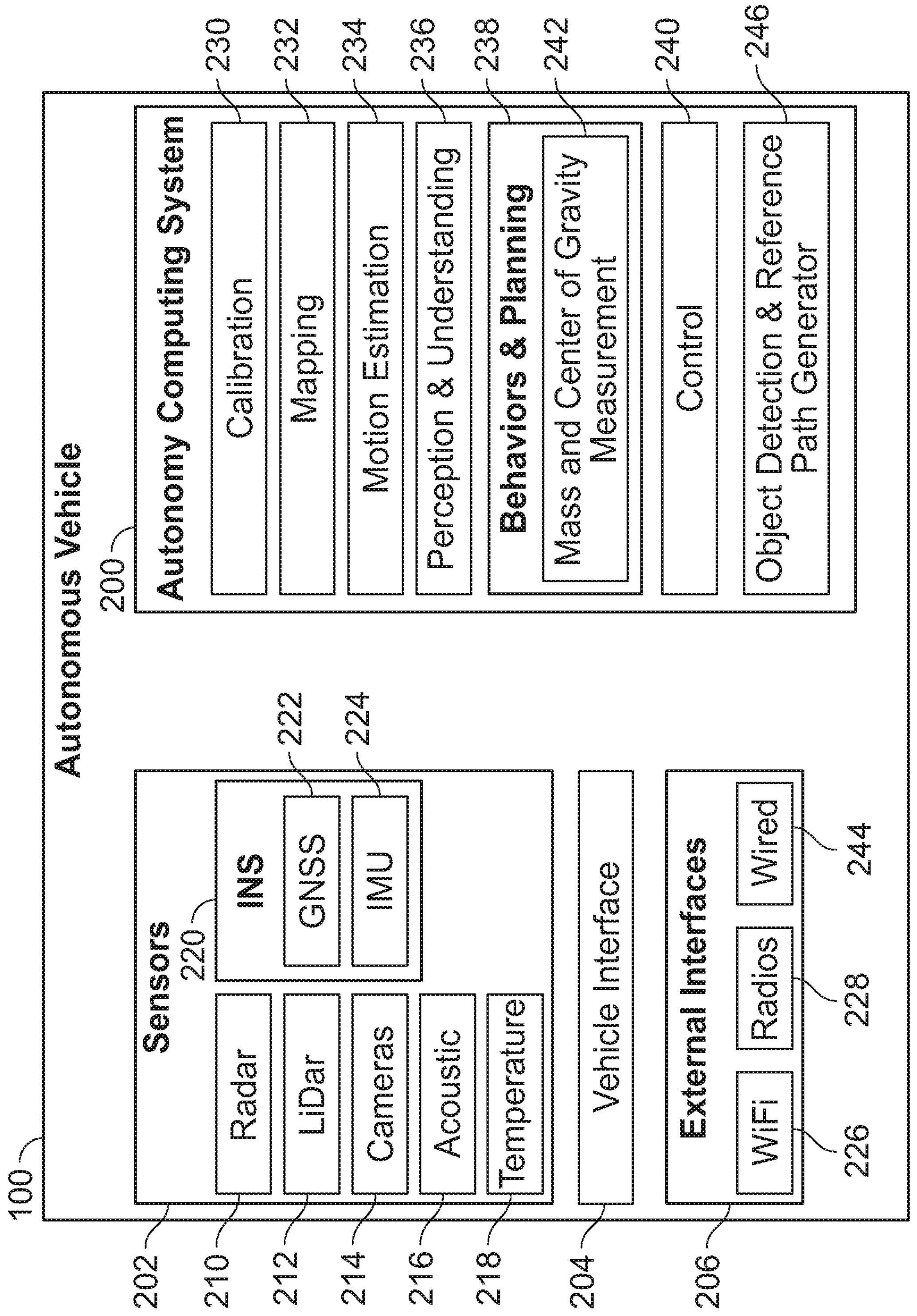
FIG. 4 is a block diagram of the autonomous truck shown in FIGS. 1-3.

FIG. 4 is a block diagram representing autonomous vehicle 100 shown in FIGS. 1-3. In the example embodiment, autonomous vehicle 100 generally includes autonomy computing system 200, sensors 202, a vehicle interface 204, and external interfaces 206. It should be understood that the sensors 110 on the vehicle 100 in FIGS. 1-3 and described herein correspond to the sensors identified as 202 in FIG. 4. The sensors 110 may specifically comprise any of the sensors 210-220 shown in FIG. 4 and described herein.

In the example embodiment, sensors 202 may include various sensors such as, for example, radio detection and ranging (RADAR) sensors 210, light detection and ranging (LiDAR) sensors 212, cameras 214, acoustic sensors 216, temperature sensors 218, or inertial navigation system (INS) 220, which may include one or more global navigation satellite system (GNSS) receivers 222 and one or more inertial measurement units (IMU) 224. Other sensors 202 not shown in FIG. 2 may include, for example, acoustic (e.g., ultrasound), internal vehicle sensors, meteorological sensors, or other types of sensors. Sensors 202 generate respective output signals based on detected physical conditions of autonomous vehicle 100 and its proximity. As described in further detail below, these signals may be used by autonomy computing system 200 to determine how to control operations of autonomous vehicle 100.

Cameras 214 are configured to capture images of the environment surrounding autonomous vehicle 100 in any aspect or field of view (FOV). The FOV can have any angle or aspect such that images of the areas ahead of, to the side, behind, above, or below autonomous vehicle 100 may be captured. In some embodiments, the FOV may be limited to particular areas around autonomous vehicle 100 (e.g., forward of autonomous vehicle 100, to the sides of autonomous vehicle 100, etc.) or may surround 360 degrees of autonomous vehicle 100. In some embodiments, autonomous vehicle 100 includes multiple cameras 214, and the images from each of the multiple cameras 214 may be processed to identify one or more construction markers in the environment surrounding autonomous vehicle 100. In some embodiments, the image data generated by cameras 214 may be sent to autonomy computing system 200 or other aspects of autonomous vehicle 100 for one or more of identifying objects around the vehicle 100, updating a reference path based on the detected objects, and controlling operation of the vehicle 100 to guide the vehicle 100 along its route.

LiDAR sensors 212 generally include a laser generator and a detector that send and receive a LiDAR signal such that LiDAR point clouds (or "LiDAR images") of the areas ahead of, to the side, behind, above, or below autonomous vehicle 100 can be captured and represented in the LiDAR point clouds. RADAR sensors 210 may include short-range RADAR (SRR), mid-range RADAR (MRR), long-range RADAR (LRR), or ground-penetrating RADAR (GPR). One or more sensors may emit radio waves, and a processor may process received reflected data (e.g., raw RADAR sensor data) from the emitted radio waves. In some embodiments, the system inputs from cameras 214, RADAR sensors 210, or LiDAR sensors 212 may be used in combination to identify one or more construction markers (or nodes) around autonomous vehicle 100.

GNSS receiver 222 is positioned on autonomous vehicle 100 and may be configured to determine a location of autonomous vehicle 100, which it may embody as GNSS data. GNSS receiver 222 may be configured to receive one or more signals from a global navigation satellite system (e.g., Global Positioning System (GPS) constellation) to localize autonomous vehicle 100 via geolocation. In some embodiments, GNSS receiver 222 may provide an input to or be configured to interact with, update, or otherwise utilize one or more digital maps, such as an HD map (e.g., in a raster layer or other semantic map). In some embodiments, GNSS receiver 222 may provide direct velocity measurement via inspection of the Doppler effect on the signal carrier wave. Multiple GNSS receivers 222 may also provide direct measurements of the orientation of autonomous vehicle 100. For example, with two GNSS receivers 222, two attitude angles (e.g., roll and yaw) may be measured or determined. In some embodiments, autonomous vehicle 100 is configured to receive updates from an external network (e.g., a cellular network). The updates may include one or more of position data (e.g., serving as an alternative or supplement to GNSS data), speed/direction data, orientation or attitude data, traffic data, weather data, or other types of data about autonomous vehicle 100 and its environment.

IMU 224 is a micro-electrical-mechanical (MEMS) device that measures and reports one or more features regarding the motion of autonomous vehicle 100, although other implementations are contemplated, such as mechanical, fiber-optic gyro (FOG), or FOG-on-chip (SiFOG) devices. IMU 224 may measure an acceleration, angular rate, or an orientation of autonomous vehicle 100 or one or more of its individual components using a combination of accelerometers, gyroscopes, or magnetometers. IMU 224 may detect linear acceleration using one or more accelerometers and rotational rate using one or more gyroscopes and attitude information from one or more magnetometers. In some embodiments, IMU 224 may be communicatively coupled to one or more other systems, for example, GNSS receiver 222 and may provide input to and receive output from GNSS receiver 222 such that autonomy computing system 200 is able to determine the motive characteristics (acceleration, speed/direction, orientation/attitude, etc.) of autonomous vehicle 100. In some embodiments, the trailer associated with the vehicle 100 can include similar sensors 202 for gathering similar data associated with the trailer, thereby further assisting with control operations of the autonomous vehicle 100.

In the example embodiment, autonomy computing system 200 employs vehicle interface 204 to send commands to the various aspects of autonomous vehicle 100 that actually control the motion of autonomous vehicle 100 (e.g., engine, throttle, steering wheel, brakes, etc.) and to receive input data from one or more sensors 202 (e.g., internal sensors). External interfaces 206 are configured to enable autonomous vehicle 100 to communicate with an external network via, for example, a wired or wireless connection, such as Wi-Fi 226 or other radios 228. In embodiments including a wireless connection, the connection may be a wireless communication signal (e.g., Wi-Fi, cellular, LTE, 5g, BLUETOOTH®, etc.).

In some embodiments, external interfaces 206 may be configured to communicate with an external network via a wired connection 226, such as, for example, during testing of autonomous vehicle 100 or when downloading mission data after completion of a trip. The connection(s) may be used to download and install various lines of code in the form of digital files (e.g., HD maps), executable programs (e.g., navigation programs), and other computer-readable code that may be used by autonomous vehicle 100 to navigate or otherwise operate, either autonomously or semi-autonomously. The digital files, executable programs, and other computer readable code may be stored locally or remotely and may be routinely updated (e.g., automatically, or manually) via external interfaces 206 or updated on demand. In some embodiments, autonomous vehicle 100 may deploy with all of the data it needs to complete a mission (e.g., perception, localization, and mission planning) and may not utilize a wireless connection or other connections while underway.

In the example embodiment, autonomy computing system 200 is implemented by one or more processors and memory devices of autonomous vehicle 100. Autonomy computing system 200 includes modules, which may be hardware components (e.g., processors or other circuits) or software components (e.g., computer applications or processes executable by autonomy computing system 200), configured to generate outputs, such as control signals, based on inputs received from, for example, sensors 202. These modules may include, for example, a calibration module 230, a mapping module 232, a motion estimation module 234, a perception and understanding module 236, a behaviors and planning module 238, a mass and center of gravity measurement module 242, a control module or controller 240, and an object detection and reference path generator module 246. The object detection and reference path generator module 246, for example, may be embodied within another module, such as behaviors and planning module 238, or separately. These modules may be implemented in dedicated hardware such as, for example, an application specific integrated circuit (ASIC), field programmable gate array (FPGA), or microprocessor, or implemented as executable software modules, or firmware, written to memory and executed on one or more processors onboard autonomous vehicle 100.

Autonomy computing system 200 of autonomous vehicle 100 may be completely autonomous (fully autonomous) or semi-autonomous. In one example, autonomy computing system 200 can operate under Level 5 autonomy (e.g., full driving automation), Level 4 autonomy (e.g., high driving automation), or Level 3 autonomy (e.g., conditional driving automation). As used herein the term “autonomous” includes both fully autonomous and semi-autonomous.

Figure 5:
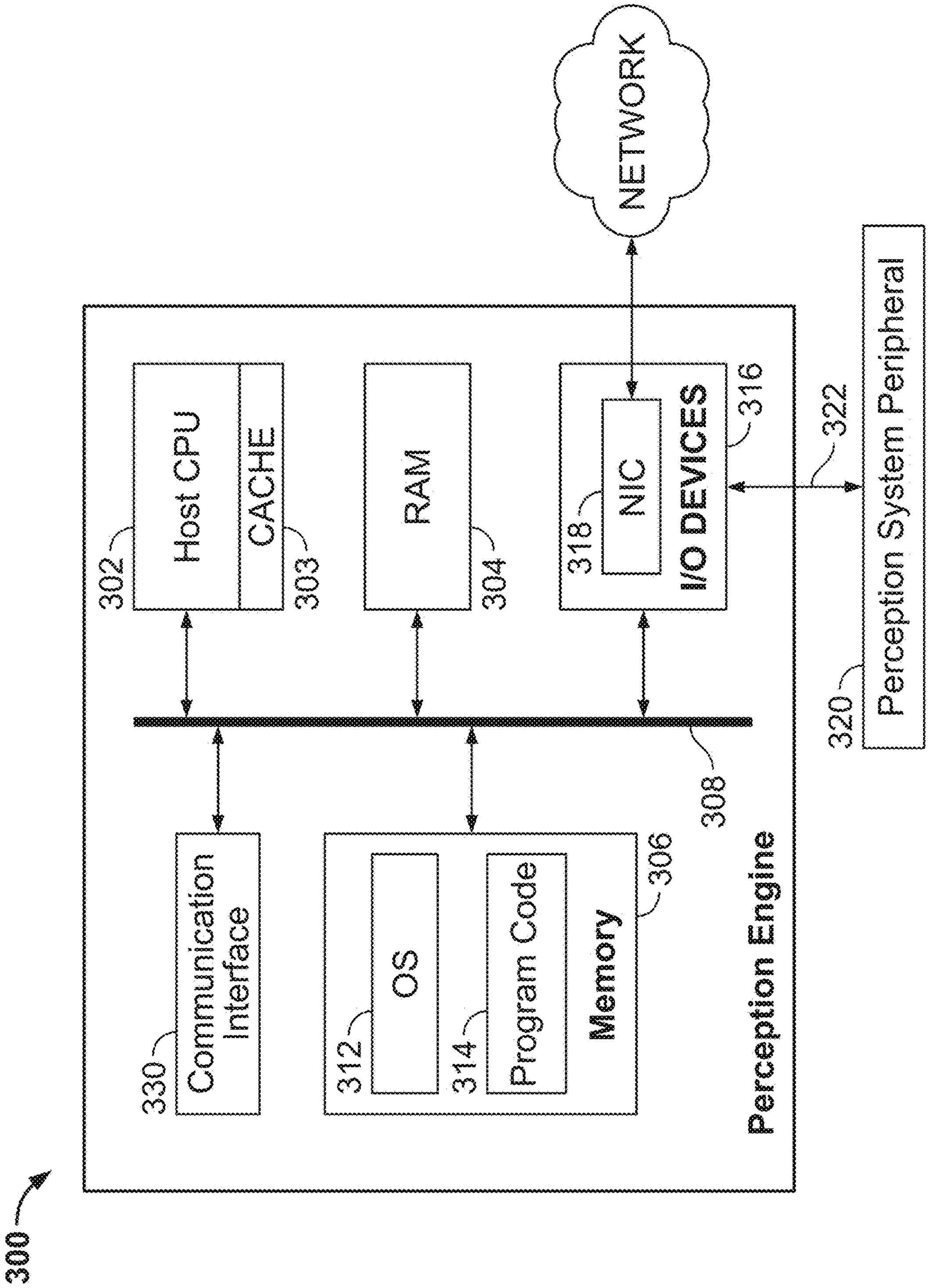
FIG. 5 is a block diagram of an example computing system.

FIG. 5 is a block diagram of an example computing system 300, such as the autonomy computing system 200 shown in FIG. 4, configured for sensing an environment in which an autonomous vehicle is positioned. Computing system 300 includes a CPU 302 coupled to a cache memory 303, and further coupled to RAM 304 and memory 306 via a memory bus 308. Cache memory 303 and RAM 304 are configured to operate in combination with CPU 302. Memory 306 is a computer-readable memory (e.g., volatile, or non-volatile) that includes at least a memory section storing an OS 312 and a section storing program code 314. Program code 314 may be one of the modules in the autonomy computing system 200 shown in FIG. 4. In alternative embodiments, one or more sections of memory 306 may be omitted and the data stored remotely. For example, in certain embodiments, program code 314 may be stored remotely on a server or mass-storage device and made available over a network 332 to CPU 302.

Computing system 300 also includes I/O devices 316, which may include, for example, a communication interface 330 such as a network interface controller (NIC) 318, or a peripheral interface for communicating with a perception system peripheral device 320 over a peripheral link 322. I/O devices 316 may include, for example, a GPU for image signal processing, a serial channel controller or other suitable interface for controlling a sensor peripheral such as one or more acoustic sensors, one or more LiDAR sensors, one or more cameras, or a CAN bus controller for communicating over a CAN bus.

Figure 6:
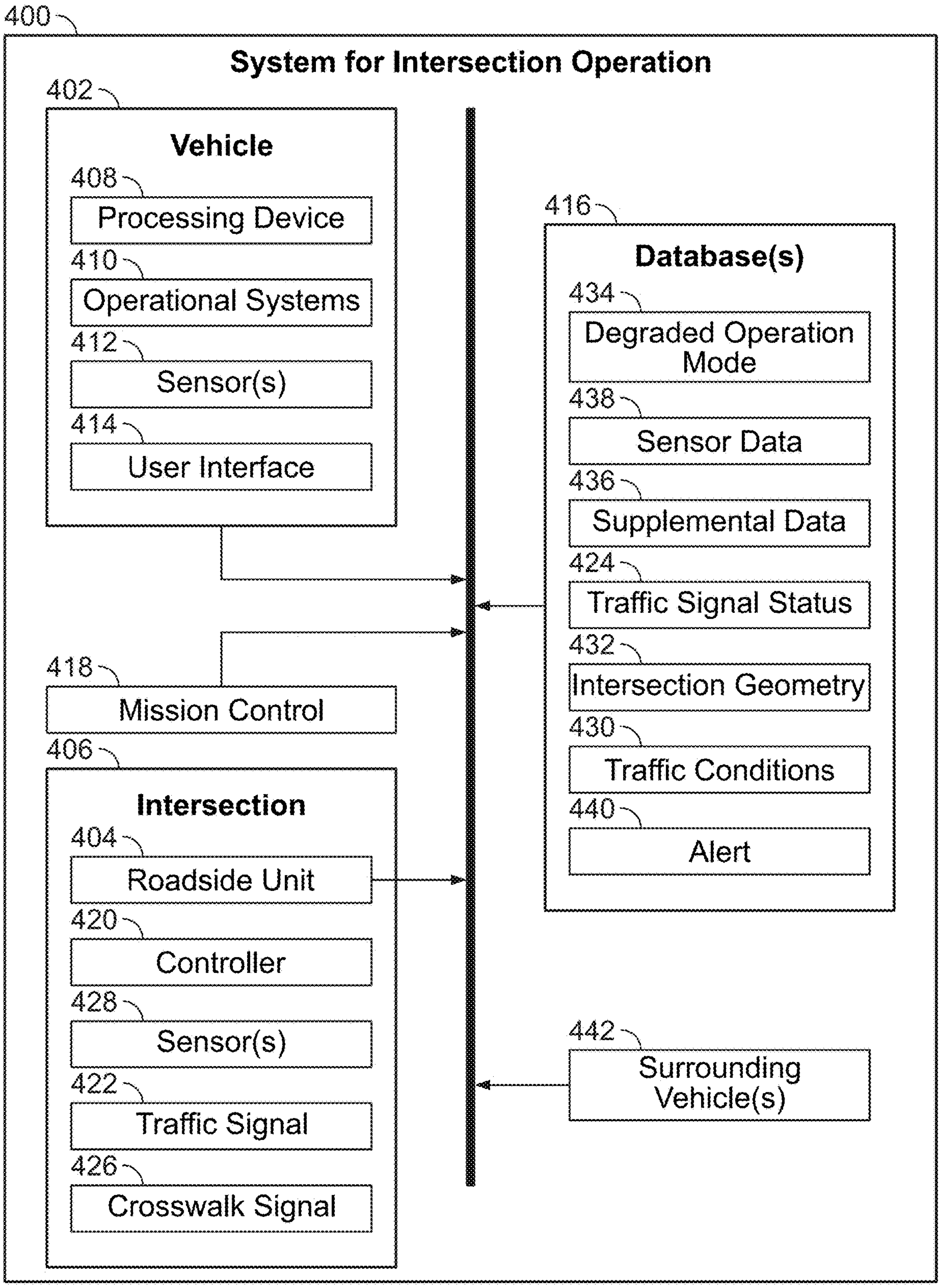
FIG. 6 is a block diagram of an exemplary system for intersection operation.

FIG. 6 is a block diagram of an exemplary system 400 for intersection operation. In particular, the system 400 creates a platform in which a vehicle 402 can communicate with a roadside unit 404 associated with an intersection 406 during a degraded state of the vehicle 402, such that the vehicle 402 can safely pass through the intersection 406 and perform a minimum risk maneuver (MRM). The system 400 generally includes one or more vehicles 402 (e.g., autonomous vehicle 100). Each vehicle 402 includes a processing device 408 (e.g., computing system 200, computing system 300, or the like) configured to receive and process data for regulation operational systems 410 (e.g., computing system 200) of the vehicle 402. At least some of the data received by the processing device 408 can be data from one or more sensors 412 (e.g., sensors 202). For example, the sensors 412 can detect other vehicles, objects, pedestrians, street signs, lane markings, traffic signals, or the like, in the environment through which the vehicle 402 travels. In some embodiments, the vehicle 402 can include a user interface 414 (e.g., a graphical user interface) for display or output of information.

The vehicle 402 can include one or more databases 416 (e.g., memory 306) configured to receive and electronically store data. In some embodiments, the database 416 can be stored externally from the vehicle 402 and the vehicle 402 can be in communication with the external database 416 for receiving and/or transmitting data associated with the system 400. In some embodiments, the database 416 can be located at mission control 418 which is in communication with the vehicle 402 and/or the roadside unit 404. In some embodiments, the roadside unit 404 is part of the infrastructure at the intersection 406, and can include its own database 416 for storing information relating to the intersection 406.

For example, the roadside unit 404 can be in communication with a controller 420 which adjusts operation of traffic signals 422 at the intersection 406. The traffic signal status 424, e.g., red, yellow, green, or the like, can be electronically stored in the database 416. In some embodiments, the traffic signal status 424 can include, e.g., remaining green time. If the traffic signal 422 is green and would allow the degraded vehicle 402 to pass through the intersection 406, in some embodiments, the roadside unit 404 can increase or extend the remaining green time for the traffic signal 422 to ensure safe passage of the vehicle 402 through the intersection 406. The controller 420 can similarly be used to operate crosswalk signals 426 at the intersection 406, and this information can be stored in the database 416. In some embodiments, the crosswalk signals 426 can be operated by the roadside unit 404 to avoid crossing of pedestrians if the vehicle 402 is approaching the intersection 406. The roadside unit 404 can be in communication with one or more sensors 428, e.g., cameras, or the like, located at or around the intersection 406. Data from the sensors 428 can be collected and stored in the database 416, and can include, e.g., traffic conditions 430, at the intersection 406. The sensors 428 can also be used to detect the intersection geometry 432 at the intersection 406. In some embodiments, the intersection geometry 432 can be separately programmed into the roadside unit 404, e.g., database 416. In some embodiments, the intersection geometry 432 can include, e.g., the number of intersecting lanes, the number of lanes for each direction of travel, the number of turn lanes, the topology at the intersection, the number and location of stop lines, the number of crosswalks, the location and size of shoulders, combinations thereof, or the like. In some embodiments, the intersection geometry 432 can include, e.g., lane connectivity for each map element, e.g., lane connectivity through the intersection, traffic light to lane associations, or the like.

In a "normal" operation mode, the sensors 412 of the vehicle 402 are fully operational and allow the vehicle 402 to accurately perceive the entire environment around the vehicle 402. In such operation, the vehicle 402 can approach and pass through the intersection 406 without additional input from the roadside unit 404. However, if one or more sensors 412 of the vehicle 402 fail or are detected to be in a degraded state, the vehicle 402 may not be able to pass through the intersection 406 in a safe manner. For example, the processing device 408 can receive signals from the sensors 412 indicative of subpar or degraded operation. The processing device 408 can automatically identify that the vehicle 402 is operating in a degraded operation mode 434. The degraded operation mode 434 status can be transmitted to mission control 418 to notify mission control 418 of the degraded sensors 412 and the need for assistance for repair.

Simultaneously, or sequentially, the processing device 408 can transmit the degraded operation mode 434 to the roadside unit 404 with a request for supplemental data 436 from the roadside unit 404. In particular, in the degraded state, some of the sensors 412 of the vehicle 402 may still be operational, and the sensor data 438 can be stored in the database 416. However, this sensor data 438 may not sufficiently provide coverage of the environment around the vehicle 402 to permit the vehicle 402 to pass safely through the intersection 406 and perform the MRM. Thus, the vehicle 402 can request the supplemental data 436 from the roadside unit 404 to safely pass through the intersection 406. For example, the request for supplemental data 436 can include specific information the vehicle 402 requires to pass through the intersection 406. This information can include, e.g., the intersection geometry 430, the traffic signal status 424, the traffic conditions 430, the location of cars at the intersection 406, the status of the crosswalk signal 426, the location of shoulders for performing the MRM procedure, the location/position and velocities of other vehicles around the vehicle 402 and/or at the intersection 406, the existence of other degraded vehicles (automated or not) at the intersection 406 which have already requested priority for passage through the intersection 406, combinations thereof, or the like. In some embodiments, if another vehicle has requested assistance for passage through the intersection 406, the roadside unit 404 can prioritize passage of the respective vehicles based on, e.g., the level of degradation, the type of failure, the distance from the intersection, the speed of travel, the number of other vehicles in the intersection, combinations thereof, or the like.

The requested information for supplemental data 436 can essentially include all information that the vehicle 402 is unable to acquire from the degraded/failed sensors 412. This information is specifically for detection of the environment around the vehicle 402 and conditions at the intersection 406, i.e., information relating to external conditions relative to the vehicle 402. It is understood that the roadside unit 404 is unable to provide data relating to sensing of information within the vehicle 402 itself. However, the external condition data can be useful for safely guiding the vehicle 402 to a position in which the MRM can be performed. The supplemental data 436 therefore "fills in the gaps" for the sensor data 438, and fusion of the received data 436 can be used to control the operational systems 410 of the vehicle 402 to pass the vehicle 402 safely through the intersection 406 and, subsequently perform the MRM.

In some embodiments, the supplemental data 436 can be transmitted to the vehicle 402, and the processing device 408 of the vehicle 402 can analyze and fuse the sensor data 438 and the supplemental data 436 to generate a route for passing the vehicle 402 through the intersection 406. In some embodiments, the data 436, 438 can be transmitted to an external processing device (e.g., at mission control 418), and mission control 418 can generate the route to be followed by the vehicle 402 through the intersection 406. In some embodiments, the supplemental data 436 may not be sufficient (in combination with the sensor data 438) to safely operate the vehicle 402. In such cases, an alert 440 can be transmitted to mission control 418 indicating the inability to resolve the degraded operation mode 434, and the vehicle 402 can slow down and stop in the current lane or pull over at a shoulder or safe location on the side of the road before reaching the intersection 406, thereby avoiding travel through the intersection 406 until the failed/degraded sensors 412 can be repaired.

In some embodiments, in addition to supplemental data 436 received from the roadside unit 404, the vehicle 402 can be in communication with one or more surrounding vehicles 442 regarding a request for all or part of the supplemental data 436. For example, the surrounding vehicles 442 can include sensors substantially similar to those of the vehicle 402, and the sensor data from these sensors can be used to generate and provide at least a portion of the supplemental data 436 to the vehicle 402. In some embodiments, the surrounding vehicles 442 can position themselves adjacent to the vehicle 402 to assist with guidance of the vehicle 402 through the intersection 406, e.g., to avoid collision with other vehicles in the vicinity. In some embodiments, data from the surrounding vehicles 442 can be coordinated for transmission to the vehicle 402 by the roadside unit 404. In some embodiments, the data from the surrounding vehicles 442 can be transmitted directly to the vehicle 402.

In some embodiments, data from the surrounding vehicles 442 can be used to supplement or reinforce the accuracy of the data 436 received from the roadside unit 404. In some instances, fusion of the supplemental data 436 with the sensor data 438 essentially allows the vehicle 402 to operate as if all sensors 412 are fully functional, e.g., no missing information regarding external conditions relative to the vehicle 402. The vehicle 402 is therefore provided with supplemental data 436 from one or more sources to safely pass through the intersection 406. After the vehicle 402 has travelled through the intersection 406, the sensor data 438 and the supplemental data 436 can be used to perform the MRM procedure. Once the MRM procedure has been completed, the roadside unit 404 can stop transmitting the supplemental data 436 to the vehicle 402, and the vehicle 402 can await assistance for repair of one or more sensors 412 that would allow the vehicle 402 to operate safely without the supplemental data 436.

Figure 7:
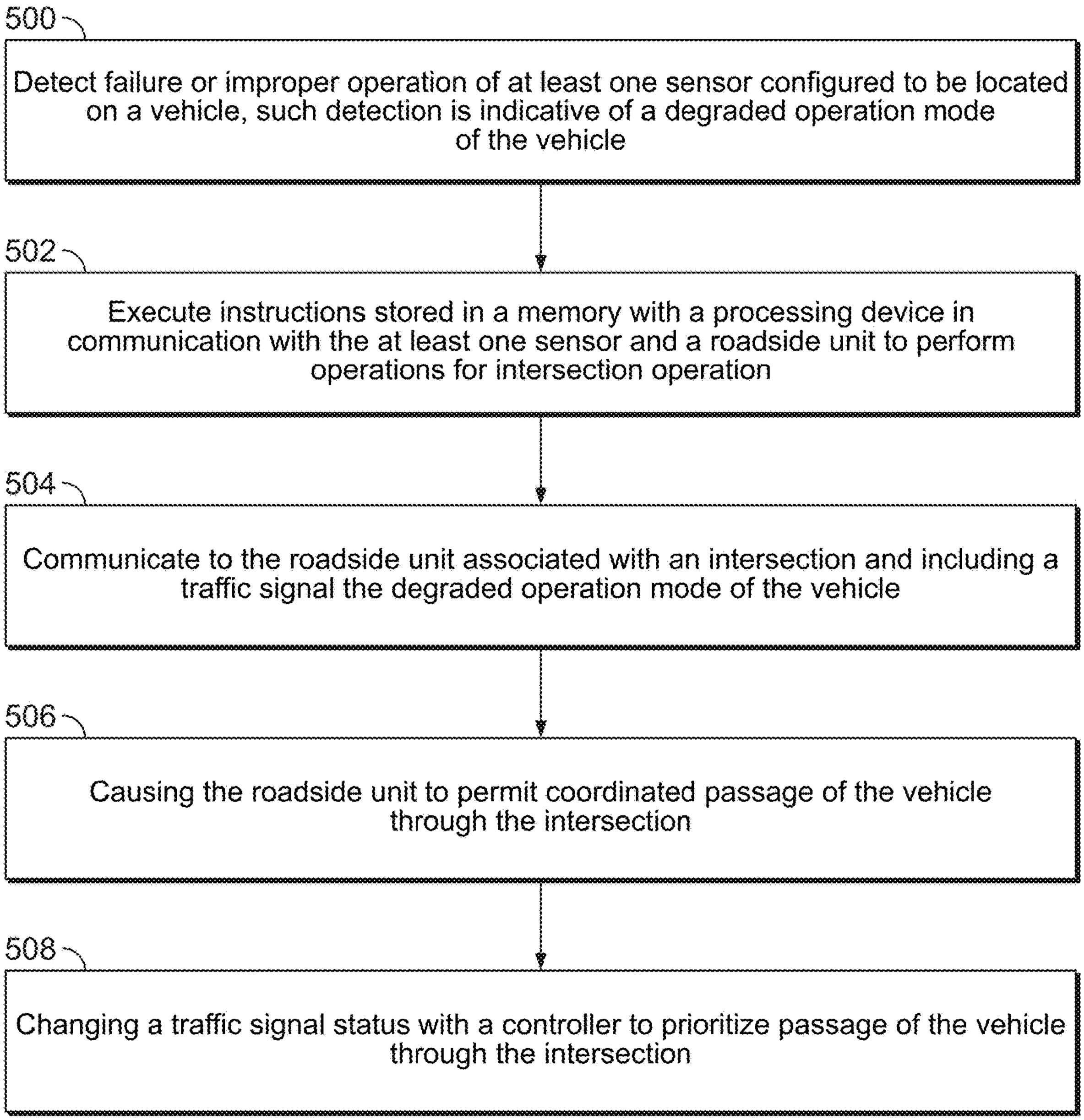
FIG. 7 is a flowchart of a method for intersection operation.

FIG. 7 is a flowchart representation of a method of intersection operation by the exemplary system 400 discussed herein. At 500, failure or improper operation of at least one sensor configured to be located on a vehicle is detected. Such detection is indicative of a degraded operation mode of the vehicle. At 502, instructions stored in a memory are executed with a processing device in communication with the at least one sensor (and/or the vehicle) and a roadside unit to perform operations for intersection operation.

At 504, the degraded operation mode of the vehicle is communicated to the roadside unit associated with the intersection and having a traffic signal. At 506, the roadside unit is caused to permit coordinated travel of the vehicle through the intersection. At 508, upon receiving a request for permitting coordinated travel of the vehicle through the intersection, the roadside unit changes the traffic signal status with a controller to prioritize travel of the vehicle through the intersection.

Figure 8:
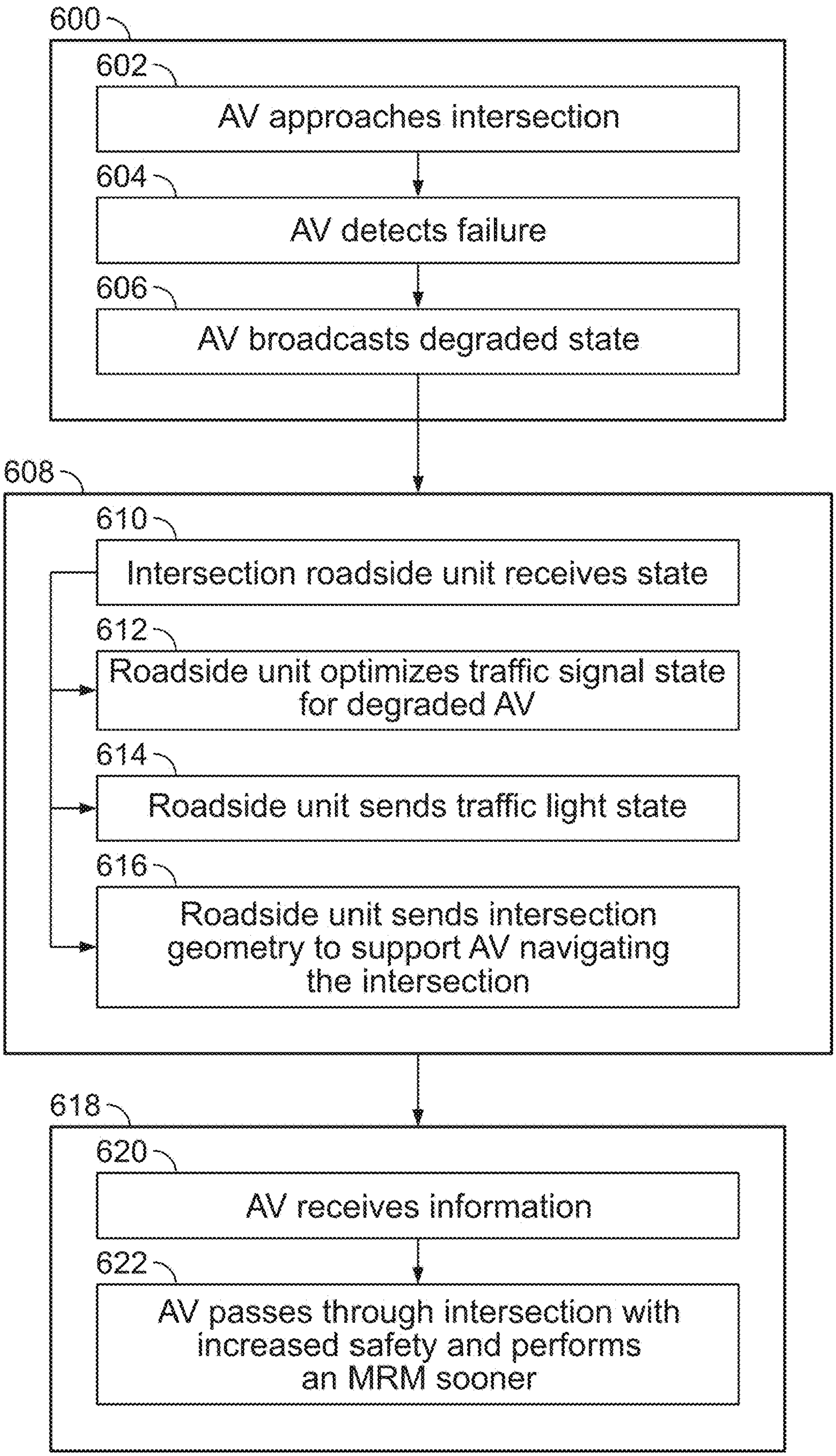
FIG. 8 is a flowchart of a method for intersection operation, including steps taken by a vehicle and steps taken by a roadside unit associated with an intersection.

FIG. 8 is a flowchart representation of a method of intersection operation by the exemplary system 400 discussed herein, including steps taken by the vehicle in the degraded state and the roadside unit. At 600 , steps are performed by the degraded state vehicle. In particular, at 602, the vehicle approaches the intersection and, at 604, the vehicle detects failure of one or more sensors, resulting in a degraded operation mode of the vehicle. At 606, the vehicle transmits or broadcasts the degraded operation mode/state of the vehicle to the roadside unit.

At 608, steps are performed by the roadside unit. At 610, the roadside unit at the intersection receives the degraded state signal from the vehicle. The roadside unit can perform either one or more of the steps 612, 614, 616. At 612, the roadside unit can optimize the traffic signal state for the degraded vehicle, such that the vehicle can be prioritized for travel through the intersection. This can be performed if the conditions at the intersection permit prioritization of the vehicle, and one or more traffic signal operations can be controller to achieve such prioritization to ensure the vehicle passes through the intersection as soon as possible. At 614, the roadside unit can send a traffic signal state to the vehicle, thereby informing the vehicle of the action needed (e.g., slowing down, continuing movement forward, or the like). This information can be helpful if the onboard sensors of the vehicle fail and the vehicle is unable to visualize the status of the traffic signal. At 616, the roadside unit can send an intersection geometry/topology to the vehicle to navigate the intersection. Having this information improves the safety of performing the travel through the intersection, as well as the subsequently performed MRM.

At 618, steps are performed by the degraded state vehicle. At 620, the vehicle receives the information from the roadside unit. A processing device associated with the vehicle (and/or mission control) can fuse the data from sensors of the vehicle and the data from the roadside unit to generate an operational plan for regulating travel of the vehicle through the intersection. At 622, the vehicle can pass through the intersection with increased safety provided by the supplemental information, and can perform the MRM procedure after the intersection using the combined data. The roadside unit therefore assists a degraded state vehicle with safe travel through an intersection the vehicle is approaching.

The various aspects illustrated by logical blocks, modules, circuits, processes, algorithms, and algorithm steps described above may be implemented as electronic hardware, software, or combinations of both. Certain disclosed components, blocks, modules, circuits, and steps are described in terms of their functionality, illustrating the interchangeability of their implementation in electronic hardware or software. The implementation of such functionality varies among different applications given varying system architectures and design constraints. Although such implementations may vary from application to application, they do not constitute a departure from the scope of this disclosure.

Aspects of embodiments implemented in software may be implemented in program code, application software, application programming interfaces (APIs), firmware, middleware, microcode, hardware description languages (HDLs), or any combination thereof. A code segment or machine-executable instruction may represent a procedure, a function, a subprogram, a routine, a subroutine, a module, a software package, a class, or any combination of instructions, data structures, or program statements. A code segment may be coupled to, or integrated with, another code segment or an electronic hardware by passing or receiving information, data, arguments, parameters, memory contents, or memory locations. Information, arguments, parameters, data, etc. may be passed, forwarded, or transmitted via any suitable means including memory sharing, message passing, token passing, network transmission, etc.

The actual software code or specialized control hardware used to implement these systems and methods is not limiting of the claimed features or this disclosure. Thus, the operation and behavior of the systems and methods were described without reference to the specific software code being understood that software and control hardware can be designed to implement the systems and methods based on the description herein.

When implemented in software, the disclosed functions may be embodied, or stored, as one or more instructions or code on or in memory. In the embodiments described herein, memory includes non-transitory computer-readable media, which may include, but is not limited to, media such as flash memory, a random access memory (RAM), read-only memory (ROM), erasable programmable read-only memory (EPROM), electrically erasable programmable read-only memory (EEPROM), and non-volatile RAM (NVRAM). As used herein, the term "non-transitory computer-readable media" is intended to be representative of any tangible, computer-readable media, including, without limitation, non-transitory computer storage devices, including, without limitation, volatile and non-volatile media, and removable and non-removable media such as a firmware, physical and virtual storage, CD-ROM, DVD, and any other digital source such as a network, a server, cloud system, or the Internet, as well as yet to be developed digital means, with the sole exception being a transitory propagating signal. The methods described herein may be embodied as executable instructions, e.g., "software" and "firmware," in a non-transitory computer-readable medium. As used herein, the terms "software" and "firmware" are interchangeable and include any computer program stored in memory for execution by personal computers, workstations, clients, and servers. Such instructions, when executed by a processor, configure the processor to perform at least a portion of the disclosed methods.

As used herein, an element or step recited in the singular and proceeded with the word "a" or "an" should be understood as not excluding plural elements or steps unless such exclusion is explicitly recited. Furthermore, references to "one embodiment" of the disclosure or an "exemplary" or "example" embodiment are not intended to be interpreted as excluding the existence of additional embodiments that also incorporate the recited features. Likewise, limitations associated with "one embodiment" or "an embodiment" should not be interpreted as limiting to all embodiments unless explicitly recited.

Disjunctive language such as the phrase "at least one of X, Y, or Z," unless specifically stated otherwise, is generally intended, within the context presented, to disclose that an item, term, etc. may be either X, Y, or Z, or any combination thereof (e.g., X, Y, and/or Z). Likewise, conjunctive language such as the phrase "at least one of X, Y, and Z," unless specifically stated otherwise, is generally intended, within the context presented, to disclose at least one of X, at least one of Y, and at least one of Z.

The disclosed systems and methods are not limited to the specific embodiments described herein. Rather, components of the systems or steps of the methods may be utilized independently and separately from other described components or steps.

This written description uses examples to disclose various embodiments, which include the best mode, to enable any person skilled in the art to practice those embodiments, including making and using any devices or systems and performing any incorporated methods. The patentable scope is defined by the claims and may include other examples that occur to those skilled in the art. Such other examples are intended to be within the scope of the claims if they have structural elements that do not differ from the literal language of the claims, or if they include equivalent structural elements with insubstantial differences form the literal language of the claims.

What is claimed is:

1. A system for intersection operation, comprising:
- a roadside unit associated with an intersection including a traffic signal, wherein the roadside unit is communicatively connected to the traffic signal;
- at least one sensor configured to be located on a vehicle; and
- a processing device in communication with the roadside unit and the at least one sensor, wherein the processing device is configured to execute instructions stored in a memory to perform operations comprising:
  - detecting failure or improper operation of the at least one sensor of the vehicle, the detected failure or improper operation indicative of a degraded operation mode of the vehicle;
  - communicating to the roadside unit the degraded operation mode of the vehicle; and
  - controlling the traffic signal with the roadside unit to prioritize and guide travel of the vehicle having the degraded operation mode through the intersection.

2. The system of claim 1, wherein the at least one sensor is configured to detect a characteristic associated with an operating component of the vehicle.

3. The system of claim 1, wherein the failure or the improper operation of the at least one sensor of the vehicle results in an inability of the vehicle to safely travel through the intersection.

4. The system of claim 1, wherein the failure or the improper operation of the at least one sensor of the vehicle results in an inability of the sensor to visualize the intersection.

5. The system of claim 1, wherein upon receiving the degraded operation mode of the vehicle at the roadside unit, the roadside unit is configured to transmit to the processing device a current status of the traffic signal.

6. The system of claim 5, wherein the current status of the traffic signal is updated in real-time and transmitted to the processing device with the roadside unit.

7. The system of claim 1, wherein upon receiving the degraded operation mode of the vehicle at the roadside unit, the roadside unit is configured to transmit to the processing device a geometry or layout of the intersection.

8. The system of claim 1, wherein the operations comprise guiding the vehicle to perform a minimal risk maneuver (MRM) after travel through the intersection.

9. The system of claim 8, wherein the minimal risk maneuver includes moving the vehicle to a side of a road and stopping.

10. The system of claim 1, wherein the operations comprise transmitting an alert to mission control regarding the degraded operation mode of the vehicle.

11. The system of claim 1, wherein the operations comprise transmitting an alert to surrounding vehicles capable of supplementing the degraded operation mode of the vehicle.

12. The system of claim 11, wherein the surrounding vehicles include sensors capable of supplementing missing information typically acquired by the at least one sensor of the vehicle.

13. The system of claim 1, wherein the vehicle is an autonomous or a semi-autonomous vehicle.

14. The system of claim 1, wherein the at least one sensor is configured to detect one or more objects around the vehicle.

15. The system of claim 1, wherein the at least one sensor is a camera.

16. The system of claim 15, wherein the camera includes a field-of-view configured to visualize the intersection as the vehicle approaches the intersection.

17. The system of claim 1, wherein the at least one sensor is radar and/or LIDAR.

18. The system of claim 1, wherein the operations further comprise controlling a pedestrian crossing signal of the intersection with the roadside unit to avoid a pedestrian crossing during passage of the vehicle having the degraded operation mode through the intersection.

19. The system of claim 1, wherein the operations further comprise (i) supplementing sensor data to the vehicle from sensors of one or more surrounding vehicles, the sensor data including missing information typically acquired by the at least one sensor of the vehicle, and (ii) positioning the one or more surrounding vehicles adjacent to the vehicle to assist with guidance of the vehicle through the intersection.

20. A computer-implemented method for intersection operation, comprising:

detecting failure or improper operation of at least one sensor configured to be located on a vehicle, wherein the detected failure or improper operation is indicative of a degraded operation mode of the vehicle; and executing instructions stored in a memory with a processing device in communication with the at least one sensor and a roadside unit to perform operations comprising:

communicating to the roadside unit associated with an intersection and including a traffic signal the degraded operation mode of the vehicle, wherein the roadside unit is communicatively connected to the traffic signal; and controlling the traffic signal with the roadside unit to prioritize and guide travel of the vehicle having the degraded operation mode through the intersection.

* * * * *